(12) United States Patent
Borikar

(10) Patent No.: US 9,921,970 B2
(45) Date of Patent: Mar. 20, 2018

(54) MULTI-LEVEL PAGING AND ADDRESS TRANSLATION IN A NETWORK ENVIRONMENT

(71) Applicant: CISCO TECHNOLOGY, INC., San Jose, CA (US)

(72) Inventor: Sagar Borikar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 15/077,355

(22) Filed: Mar. 22, 2016

(65) Prior Publication Data

US 2016/0202918 A1 Jul. 14, 2016

Related U.S. Application Data

(63) Continuation of application No. 14/494,302, filed on Sep. 23, 2014, now Pat. No. 9,317,446.

(51) Int. Cl.
| | |
|---|---|
| *G06F 12/00* | (2006.01) |
| *G06F 13/00* | (2006.01) |
| *G06F 12/109* | (2016.01) |
| *G06F 3/06* | (2006.01) |
| *G06F 12/10* | (2016.01) |

(52) U.S. Cl.
CPC .......... *G06F 12/109* (2013.01); *G06F 3/0605* (2013.01); *G06F 3/067* (2013.01); *G06F 3/0631* (2013.01); *G06F 12/10* (2013.01); *G06F 2212/154* (2013.01); *G06F 2212/65* (2013.01); *G06F 2212/651* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 5,715,419 A | 2/1998 | Szczepanek et al. | |
| 6,738,882 B1 | 5/2004 | Gau | |
| 7,752,360 B2 | 7/2010 | Galles | |
| 7,934,033 B2 | 4/2011 | Malwankar et al. | |
| 8,205,031 B2 | 6/2012 | Kao et al. | |
| 9,317,446 B2 | 4/2016 | Borikar | |
| 2002/0138709 A1* | 9/2002 | Ball | G06F 13/423 711/211 |
| 2006/0143311 A1* | 6/2006 | Madukkarumukumana | G06F 13/28 710/1 |
| 2006/0149888 A1 | 7/2006 | Dong et al. | |
| 2012/0278525 A1* | 11/2012 | Serebrin | G06F 11/1451 711/6 |

(Continued)

*Primary Examiner* — Sean D Rossiter
(74) *Attorney, Agent, or Firm* — Polsinelli PC

(57) ABSTRACT

An example method for facilitating multi-level paging and address translation in a network environment is provided and includes receiving a request for memory in a physical memory of a network element, associating the request with a first virtual address space, mapping a memory region located in the physical memory to a first window in the first virtual address space, the memory region being also mapped to a second window in a different, second virtual address space, remapping the first window in the first virtual address space to the second window in the second virtual address space, and responding to the request with addresses of the second window in the second virtual address space.

20 Claims, 7 Drawing Sheets

(56) References Cited

U.S. PATENT DOCUMENTS

| | | | |
|---|---|---|---|
| 2014/0164666 A1* | 6/2014 | Yang | G06F 13/28 |
| | | | 710/308 |
| 2015/0052322 A1* | 2/2015 | Tsirkin | G06F 9/4856 |
| | | | 711/162 |
| 2015/0052323 A1* | 2/2015 | Noel | G06F 12/00 |
| | | | 711/162 |
| 2015/0058533 A1* | 2/2015 | El-Batal | G06F 13/385 |
| | | | 711/103 |
| 2015/0106587 A1* | 4/2015 | Che | G06F 12/109 |
| | | | 711/209 |
| 2015/0178010 A1* | 6/2015 | Chang | G06F 3/061 |
| | | | 711/170 |
| 2016/0085684 A1 | 3/2016 | Borikar | |

* cited by examiner

MULTI-LEVEL PAGING AND ADDRESS TRANSLATION IN A NETWORK ENVIRONMENT

RELATED APPLICATION

This Application is a continuation (and claims the benefit of priority under 35 U.S.C. § 120) of U.S. application Ser. No. 14/494,302, filed Sep. 23, 2014, entitled "MULTI-LEVEL PAGING AND ADDRESS TRANSLATION IN A NETWORK ENVIRONMENT," Inventor Sagar Borikar. The disclosure of the prior application is considered part of (and are incorporated by reference in) the disclosure of this application.

BACKGROUND

Computing systems including many advanced networking devices (such as switches and routers) typically contain a combination of hardware and software components, such as processors, buses, memory elements, input/output devices, operating systems and applications. Computing systems also include a data transfer subsystem to transfer data between the components inside the computing system. Older data transfer subsystems, such as Peripheral Component Interconnect ('PCI') and the PCI-eXtended ('PCI-X'), include a computer bus that logically connects several components over the same set of wires and transfers data among the components in parallel. Newer data transfer subsystems, such as PCI Express ('PCIe') based subsystems, include point-to-point connections between components that facilitate serial data transmittal.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating multi-level paging and address translation in a network environment is provided and includes receiving a request for memory in a physical memory of a network element, associating the request with a first virtual address space, mapping (e.g., associating, linking, relating, correlating, connecting, coupling, representing, corresponding, matching, etc.) a memory region to a first window in the first virtual address space, the memory region being located in the physical memory, the memory region being also mapped to a second window in a different, second virtual address space, remapping the first window in the first virtual address space to the second window in the second virtual address space, and responding to the request with addresses of the second window in the second virtual address space.

As used herein, the term "memory region" comprises a block (e.g., section, portion, slice, chunk, piece, space, etc.) of memory that can be accessed through a contiguous range of memory addresses (e.g., a memory address is a unique identifier (e.g., binary identifier) used by a processor for tracking a location of each memory byte stored in the memory). "Virtual address space" refers to a set of ranges of virtual (e.g., non-physical, unreal, etc.) addresses that are made available to processes or devices. The virtual address space renders the physical memory opaque to the processes and devices requesting memory. As used herein, the term "window" in the context of virtual address spaces refers to a virtual memory region comprising a contiguous range of virtual addresses.

Example Embodiments

Figure 1:
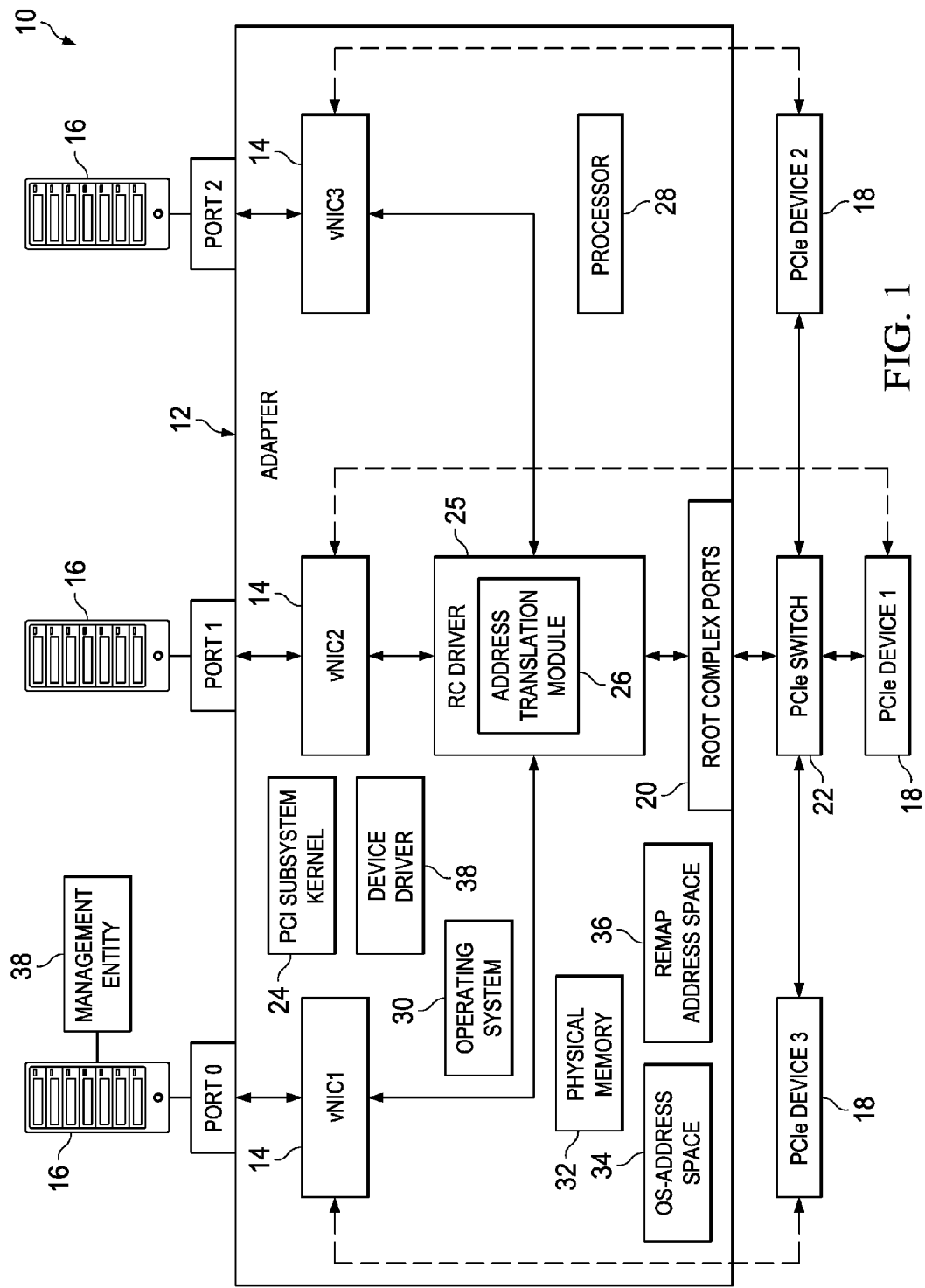
FIG. 1 is a simplified block diagram illustrating a communication system for facilitating multi-level paging and address translation in a network environment.

Turning to FIG. 1, FIG. 1 is a simplified block diagram illustrating a communication system 10 for facilitating multi-level paging and address translation in a network environment in accordance with one example embodiment. FIG. 1 illustrates a communication system 10 comprising an adapter 12 that provides high speed (e.g., 10 G/40 G) input/output interfaces, called virtual Network Interface Cards (vNICs) 14 for network and storage traffic. Adapter 12 comprises an endpoint to a plurality of computing systems (e.g., servers) 16 and deploys vNICs 14 to support storage and networking functionality. In various embodiments, adapter 12 includes support for PCIe root complex, which enables adapter 12 to facilitate communication with multiple PCIe devices 18 through root complex ports 20 and in some embodiments, a PCIe switch 22. Thus, adapter 12 serves as a single host for multiple PCIe devices 18. Root complex support for PCIe devices 16 can be used in several different ways to extend virtualization such that real physical devices can be shared across multiple servers 16.

In various embodiments, a PCI subsystem kernel 24 (e.g., computer code executing from a kernel space of adapter 12's memory) and a root complex driver 25 may discover PCIe devices 18 on initialization (e.g., boot-up, start-up, etc.). Root complex driver 25 may include an address translation module (ATM) 26 that can provide a mechanism to access more than 32-bit address spaces from 32-bit processors, such as a processor 28 in adapter 12. Note that processor 28 can comprise 32- or 64-bit (or any other appropriate instruction set architecture) processors within the broad scope of the embodiments. ATM 26 can enable adapter 12 to support multiple PCIe devices 18 on the root complex without requiring changes to a default operating system (OS) 30's paging and address translation mechanism, which translates addresses in a physical memory 32 into a virtual OS address space 34.

ATM 26 can provide another virtual remap address space 36 to enable device driver(s) 38 in operating system 30 to co-exist without overwriting or corrupting address spaces of different PCIe devices 18 (e.g., in OS address space 34 or physical memory 32). ATM 26 can enable different types of PCIe device 18 in a manner transparent to operating system 30 and to device driver(s) 38. In various embodiments, ATM 26 can abstract virtual address translation in platform specific design and implementation and without requiring any changes in vendor provided stock device driver(s) 38 that work with respective PCIe devices 18.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A PCIe data transfer subsystem in a computing system (such as that of an adapter) uses existing PCI programming and software concepts, and is based on a different and much faster serial physical-layer communications protocol. The physical-layer includes a network of serial interconnections extending to each PCIe adapter from a PCIe root complex. The PCIe root complex comprises a computer hardware chipset that handles communications between the components of the computing system such as, for example, a computer processor, random access memory non-volatile memory, power management components, real-time system clock, etc. The root complex enables PCIe devices to be discovered, enumerated and worked upon by the host operating system. The PCIe root complex includes a host bridge for communicating with one or more computer processors on the host and a number of ports that each provides data communication with a corresponding port on a PCIe device. Root complex functionality may be implemented as a discrete device, or may be integrated with the processor.

The base PCIe switching structure of a single root complex has a tree topology, which addresses PCIe endpoints through a bus numbering scheme. Configuration software on the root complex detects every bus, device and function (e.g., storage adapter, networking adapter, graphics adapter, hard drive interface, device controller, Ethernet controller, etc.) within a given PCIe topology. Each bus is assigned a bus number by the configuration software; up to 32 device attachments are permitted on a single bus; each device may implement one or more functions (e.g., up to 8).

The host operating system assigns address space in the host memory to each PCIe device so that the PCIe device can understand at what address space it is identified by the host and map the corresponding interrupts accordingly. After the host configuration of the PCIe endpoint device is complete, the PCIe's device driver compatible with the host operating system can work efficiently with the PCIe device and facilitate the appropriate device specific functionality.

Each PCI device is enabled on the host computing system by being mapped into the computing system's input/output (I/O) port address space or memory-mapped address space. PCIe devices have a set of registers referred to as configuration space (e.g., register, typically consisting of 256 bytes) that are mapped to memory locations on the host computing system. The PCI configuration space controls the behavior of the corresponding PCI device at all times. The configuration space is primarily used as part of the enumeration and allocation of a device driver (e.g., computer program that operates and controls the PCIe device) to the PCIe device. Device drivers and diagnostic software must have access to the configuration space. For example, the device driver allocates buffers in the read only memory (RAM) of the host for the device; the addresses of the buffers are written in the configuration space.

The configuration space contains a number of base address registers (BARs). The BARs are programmable decoders that are used to decode access to the actual device registers. An enumeration software allocates all the memory for the devices requested by the enumeration process and writes to all the device BARs. The computing system's firmware, device drivers or the operating system programs the PCIe device's BARs mapped in the host memory to inform the PCIe device of its address mapping. When the BAR for a particular PCIe device is written, all memory transactions generated to that bus address range are claimed by the particular PCIe device.

Initially, upon system reset, all PCI devices are in an inactive state and have no addresses assigned to them by which the operating system or device drivers can communicate with them. Subsequently, the operating system geographically addresses PCI slots (e.g., in a sequential manner). The operating system attempts to read a vendor (or device) ID register for each combination of bus number and device number. If no response is received from the device, the operating system performs an abort and returns an all-bits-on value (FFFFFFFF in hexadecimal) indicating that the bus/device/function is not present. When a read to a specified bus/device/function combination for the vendor ID register succeeds, the device driver knows that the device exists; it writes all ones to its BARs and reads back the device's requested memory size in an encoded form. At this point, the operating system programs the memory-mapped and I/O port addresses into the PCIe device's BAR configuration register. The addresses stay valid as long as the computing system remains turned on. Upon power-off, all these settings are lost and the procedure is repeated next time the system is powered back on.

In a general sense, a physical PCIe device is typically configured such that there is a direct mapping of PCIe devices to memory addresses. A request directed to a specific PCIe device, such as a request from a device driver, includes a hard-coded address associated with the PCIe device. When the request is received at the adaptor, the adaptor decodes the address and the request is processed utilizing the PCIe device associated with the hard-coded address.

Thus, as a part of configuration, the host operating system must have processor addressability equal to or greater than the address associated to the device during enumeration. For example, with 32 bit processors, the host operating system assigns 32 bit addresses as BARs to the PCIe devices. However, in some adapters, the root complex address space (e.g., address space allocated to the root complex and hence to the PCIe devices that are located behind the root complex) can reside beyond the addressability of the processor, creating a functional mismatch for the operating system to work with the PCIe devices residing below the root complex. Some adapters provide a hardware feature called a remap window to enable accessing the address space beyond the processor's memory addressability. However, the remap window in hardware presents a raw image of the memory footprint, and is not amenable to paging (e.g., using the operating system's virtual address maps).

The operating system of a computing system performs memory management through paging and virtual address space. In a general sense, the physical memory of a device (e.g., a computing system) is the memory that a processor addresses on its bus. For example, a Pentium Pro processor has 236 bytes (64 Gbytes) of physical address space. However, the processor instructions only allow access to the address space from zero to 4 Gbytes. Each byte of memory storage is assigned a unique address from zero to $2^{36}-1$, called a physical address. The physical address space is flat; in other words, unsegmented. Segmentation and paging are memory management facilities that allow memory to be managed efficiently. Programs do not directly address physical memory; instead, they access the memory using various memory models, for example flat memory model and/or segmented memory model. In the flat memory model, memory appears to a program as a single continuous address space called linear address space, which is byte addressable, with addresses running up to $2^{32}-1$. Code, data, and the procedure stack are all contained in the continuous address space.

In the segmented memory model, memory is grouped into independent address spaces called segments. Code, data, and stacks are typically contained in separate segments. To address a byte in a segment, a program issues a logical address, which consists of a 16-bit segment selector and a 32-bit offset. The segment selector identifies the segment to be accessed and the offset identifies a byte in the address space of the segment. The processor maps every logical address into a linear address within the linear address space. If paging is not used, the processor maps linear addresses into physical addresses. If paging is used, a second level of address translation is used to translate the linear address into a physical address.

Paging, also called virtual memory, allows the processor to map a linear address into a smaller physical address space and disk storage. The processor divides the linear address space into 4 kbyte, 2 Mbyte, or 4 Mbyte size pages that can be mapped into physical memory. When a program references a logical address, the processor translates the logical address into a linear address (e.g., address in the linear address space). It then uses the paging mechanism to translate the linear address into a corresponding physical address.

In other words, the virtual address space of the paging facility refers to a set of ranges of virtual (e.g., non-physical, unreal, etc.) addresses that the operating system makes available to a process; the virtual addresses are mapped to physical addresses in the computing system's physical memory and the mappings are stored in page tables. The range of virtual addresses usually starts at a low address and can extend to the highest address allowed by the computer's instruction set architecture. When a new application process on a 32-bit operating system (e.g., corresponding to a 32 bit instruction set architecture) is executed, the process has a 4 GB virtual address space: each one of the memory addresses from 0 to $2^{32}-1$ in the virtual address space can have a single byte as value. Presently, most operating systems do not allow access to memory addresses above 32-bits, or 4 Gbytes.

Nevertheless, Address Windowing Extensions (AWE) is a set of extensions that allows an application to quickly manipulate physical memory greater than 4 GB. AWE allows applications to directly address large amounts of memory while continuing to use 32-bit pointers, thereby allowing applications to have data caches larger than 4 GB (where sufficient physical memory is present). AWE uses physical non-paged memory and window views of various portions of the physical memory within a 32-bit virtual address space. Remapping in AWE comprises manipulating virtual memory tables. However, virtual address ranges allocated for the AWE are not sharable with other processes.

Thus, with hardware remap, paging cannot be used; and with AWE, virtual address space allocated to AWE is not sharable between processes.

Communication system 10 is configured to address these issues (among others) to offer a system and method for facilitating multi-level paging and address translation in a network environment. Assume, merely for example purposes and not as a limitation that the root complex of adapter 12 (and thereby PCIe devices 18) are assigned an address space beyond the addressable range of processor 28. The BAR of each PCIe device 18 would reference (e.g., indicate, point to, be associated with, etc.) an address range that processor 28 cannot access. In various embodiments, ATM 26 is configured to assign the relevant BAR, upon request from a device driver, to a reusable remap window (e.g., memory region with addresses provided for the BAR by the root complex) in remap address space 36; thus each BAR indicating an address range beyond the addressability of processor 28 could be mapped to corresponding addresses in reusable remap window in remap address space 36. For example, BAR 1 may be assigned to a 4 GB window starting at address FFFFA80000051000 in remap address space 36. The addresses in remap address space 36 may be irrelevant to operating system 30 or processor 28.

ATM 26 may allocate addresses in remap address space 36 to the BARs according to any suitable mechanism. For example, the BARs may be assigned to respective base addresses in remap address space 36 and corresponding offsets. In various embodiments, the base addresses indicated by the respective BARs may comprise addresses beyond an addressability range of processor 28. ATM 26 may map each address in remap address space 36 to a physical address in physical memory 32. In other words, each remap window in remap address space 36 would correspond to a contiguous memory region in physical memory 32. Each such contiguous memory region in physical memory 32 has a corresponding window (e.g., memory region, for example, with addresses provided by operating system 30) in OS address space 34, mapped by operating system 30. Thus, each remap window in remap address space 36 corresponds to another window in OS address space 34, both such windows indicating the same memory region in physical memory 30.

In some embodiments, ATM 26 may be aware of the mapping between addresses in remap address space 36 and corresponding addresses in OS address space 34, whereas operating system 30 may be unaware of the exact mapping. For example, ATM 26 may be aware that address FFFFA80000051000 in remap address space 36 corresponds to address 7F793950000 in OS address space 34, which corresponds to address 7F793951001 in physical memory 32.

In other embodiments, both ATM 26 and operating system 30 may be unaware of the mapping between addresses in remap address space 36 and OS address space 34, each of ATM 26 and operating system 30 being aware only of their respective mappings to physical memory 32. For example, ATM 26 may be aware that address FFFFA80000051000 in remap address space 36 maps to address 7F793951001 in physical memory 32; likewise, operating system 30 may be aware that address 7F793950000 in OS address space 34 maps to address 7F793951001 in physical memory 32; however ATM 26 and operating system 30 may not be aware that address FFFFA80000051000 in remap address space 36 corresponds to address 7F793950000 in OS address space 34.

In various embodiments, operating system 30 may receive a request for memory in physical memory 32 from device driver 38. The request may be from device driver 38 and may reference a BAR of a particular PCIe device 18. The BAR may correspond to an address space beyond an addressability range of processor 28, in some embodiments. Operating system 30 may associate the request with remap address space 36 and punt the request to ATM 26. ATM 26 may map a memory region in physical memory 32 to a first window in remap address space 36, the memory region corresponding to the requested memory size. Operating system 30 may independently map the memory region in physical memory 32 to a second window in different, OS virtual address space 34.

ATM 26 and operating system 30 may remap the memory region from the first window in remap address space 36 to the second window in OS address space 34. Operating system 30 may respond to the request from device driver 38 with addresses of the second window in OS address space 34. In various embodiments, the remapping includes identifying physical memory addresses of the memory region corresponding to the first window in remap address space 36 and identifying the second window in OS address space 34 corresponding to the physical memory addresses.

In various embodiments, ATM 26 can enable adapter 12 to communicate with several PCIe devices 18 behind root complex ports 20 with the help of remap address space 36 and by adding multilevel address translation support in operating system 30. In some embodiments, adapter 12 includes a 32 bit MIPS processor 28, which is used to discover and enumerate third party PCIe devices 18 and make them accessible to servers 16. In some embodiments, the root complex address space available to PCIe devices 18 may be beyond the addressable range of 32 bit MIPS processor 28. Using remap address space 36, ATM 26 can provide virtual address translation from 33 bit address of the root complex address space to the 32 bit processor addressable range in a manner transparent to operating system 30.

In various embodiments, operating system 30 (e.g., with the help of platform specific design) discovers root complex PCIe ports 20 on adapter 12 and third party PCIe devices 18 (e.g., which may include PCIe bridges and third party end point devices). Operating system 30 may associate address spaces in remap address space 36 with PCIe devices 18 discovered as per requests issued by corresponding device driver(s) 38. In other words, operating system 30 may associate the BAR numbers of PCIe devices 18 with remap address space 36.

Remap address space 36 may be substantially totally transparent to operating system 30 (e.g., operating system 30 cannot access remap address space 36) for example, because it is modified by ATM 26 that executes on adapter 12 (independent of operating system 30). In some embodiments, RC driver 25 may report discovered PCIe devices 18 to a management entity 38 (e.g., unified computing system, which may execute in one of servers 16). Management entity 38 may request RC driver 25 to instantiate respective vendor provided device driver(s) 38 to manage PCIe devices 18. Subsequently, a usual device specific initialization and functional flow may be executed.

Device driver 38 may issue a request to operating system 30 for memory associated to the BAR of respective PCIe device 18. Operating system 30's address remapping logic may invoke ATM 26 to handle the request and translate from a physical to a virtual mapping. ATM 26 may decode the BAR address and determine that the request corresponds to a particular PCIe device 18 residing behind the root complex. ATM 26 may configure a remap window in remap address space 36 to translate the BAR address requested by device driver 38 to an acceptable programmable range in remap address space 36.

In some embodiments, ATM 26 may perform one more level of virtual translation from the physical address to the MIPS processor specific virtual address of OS address space 34. ATM 26 may return the newly mapped virtual address to operating system 30, which then passes the address to device driver 38. In some embodiments, ATM 26 may provide the physical memory addresses in physical memory 32 to operating system 30, which may translate the physical memory addresses to operating system specific virtual addresses in OS address space 34 and return the virtual addresses to device driver 38. Device driver 38 may thereafter perform regular transactions with the virtual addresses. In various embodiments, ATM 26 may implement its own page translation sequence under a hood of operating system 30's page translation without disclosing the translation process to operating system 30. In various embodiments, if the address space range cannot be serviced in remap address space 36, an appropriate error may be generated. In various embodiments, the same remap window space may be used for providing remapped virtual addresses to multiple PCIe devices 18 that are instantiated through respective device drivers 38 by management entity 38.

In an example embodiment, device driver 38 may request a memory mapped address to access the device memory through a PCI_IOMAP(BAR) API function call. PCI subsystem kernel 24 may pass the PCI_IOMAP request to RC driver 25 to return the remapped address for the bus address programmed in the BAR. As part of remapping, ATM 26 may check whether the bus address of the BAR resides in a predefined address map that the root complex has reserved for PCIe devices 18. ATM 26 may identify the particular PCIe device 18, which corresponds to the requested BAR.

After scanning through existing remap windows, ATM 26 may check whether any of the already allocated remap windows in remap address space 36 can be reused for satisfying the new request. If an already allocated remap window in remap address space 36 can satisfy the request, ATM 26 may return an uncached remapped address of the corresponding physical offset in the remap window. If no remap window satisfies the request, ATM 26 may allocate a new remap window for the bus address and return the uncached remapped address. Using the remapped address, device driver 38 can access the device register space. Note that if no remap window is available (e.g., physical memory 32 is full), ATM 26 may return NULL. In some embodiments, four remap windows of 4 MB size each may be available to access RC address space 36.

The remap window translations may be substantially completely abstract (e.g., transparent) to device driver 38. In some embodiments, if several PCI device drivers request memory, the available remap window space may be exhausted and some device drivers may not be able to get their requests fulfilled to access the device memory allocated in adapter 12. It may be also noted that if the allocated addresses of different BARs are out of range of any one available window (e.g., 4 MB), multiple remap windows may be used to satisfy the memory request. In some embodiments, a single device driver requesting access to the device memory may substantially always succeed.

Embodiments of communication system 10 can provide a mechanism that is transparent to operating system 30 and can translate higher order addresses (e.g., beyond a 32 bit address range) allocated to PCIe devices 18 to lower order addresses (e.g., within a 32 bit address range) that are addressable by processor 28 seamlessly such that default operating system's address translation and paging are not materially affected. A new layer of mapping may be introduced to be used to access any range of address translation for any device.

Turning to the infrastructure of communication system 10, the network topology in which adapter 12 operates can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment in which adapter 12 operates may be configured over a physical infrastructure that may include one or more networks and, further, may be configured in any form including, but not limited to, local area networks (LANs), wireless local area networks (WLANs), VLANs, metropolitan area networks (MANS), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, adapter 12 comprises a PCIe-based Converged Network Adapter (CNA) deployable on computers, such as blade and rack servers. For example, adapter 12 comprises a computer input/output device that combines the functionality of a host bus adapter (HBA) with a network interface controller (NIC), converging access to, respectively, a storage area network and a general-purpose computer network. In some embodiments, adapter 12 may be implemented in a stand-alone pluggable motherboard configured with appropriate interfaces to enable communication with PCIe device 18 and computing systems 16. In other embodiments, adapter 12 may be implemented in a motherboard integrated with one of computing systems 16.

Note that although a plurality of computing systems 16 are illustrated herein, embodiments of communication system 10 can operate with only one computing system 16 within the broad scope of the embodiments. Computing systems 22 can include any suitable server, such as blade servers, rack servers, or other computing devices. In some embodiments, ATM 26 comprises a software module integrated with the adapter's firmware (e.g., in RC driver 25) and configured to perform the remap operations described herein. Note that in some embodiments, ATM 26 may be independent of RC driver 25, and may execute separately from RC driver 25. PCIe devices 18 include storage devices, peripherals (e.g., display monitor, keyboard, etc.), televisions, and other sources or destinations of network traffic.

Figure 2:
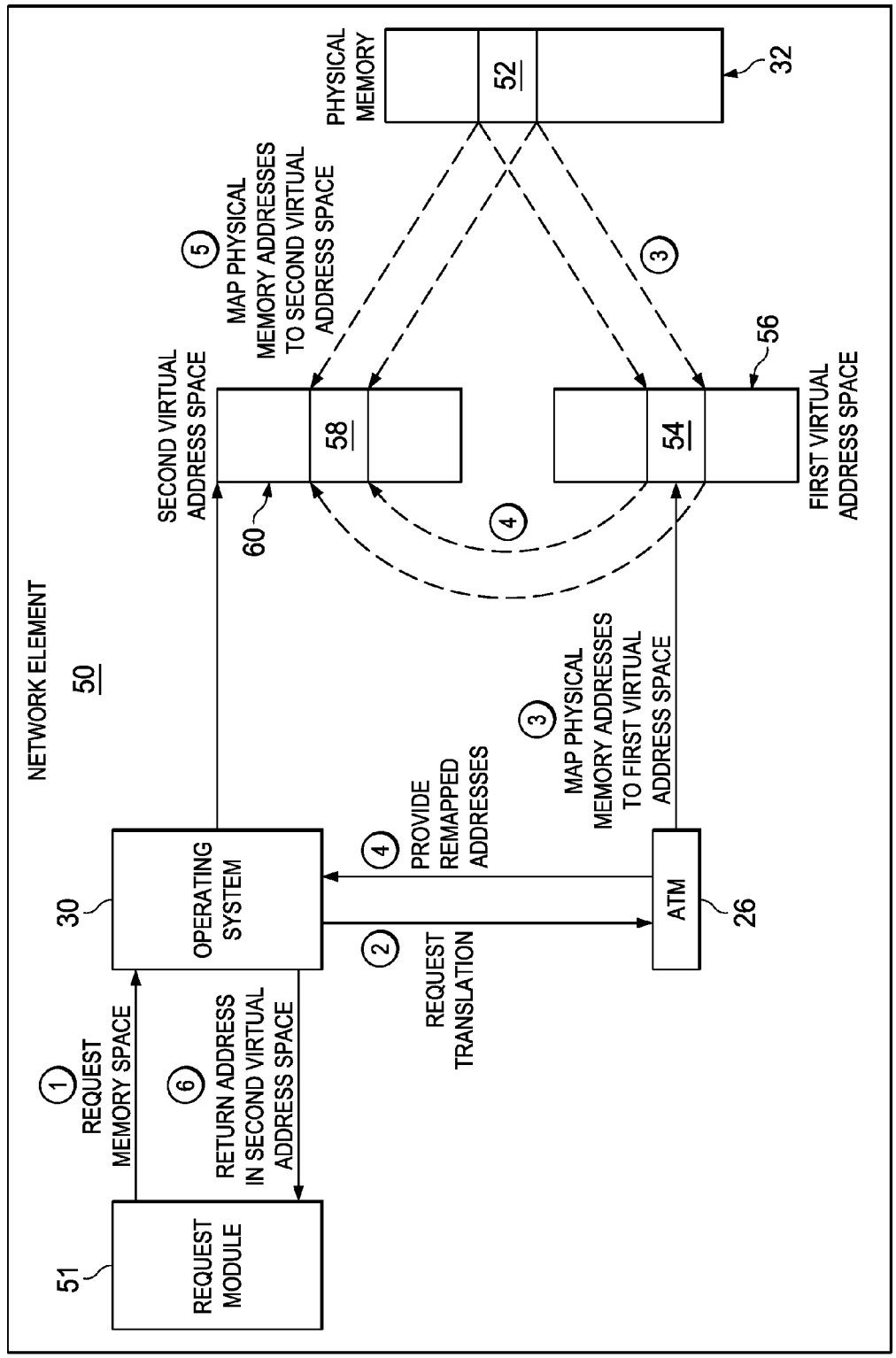
FIG. 2 is a simplified block diagram illustrating other example details of embodiments of the communication system.

Turning to FIG. 2, FIG. 2 is a simplified block diagram illustrating example details of an embodiment of communication system 10. According to various embodiments, network element 50 may include ATM 26, operating system 30 and physical memory 32. As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

A request module 51 (e.g., in device driver 38) may request memory from operating system 30. Operating system 30 may punt the request to ATM 26, requesting appropriate translation of memory addresses. ATM 26 may map a memory region 52 in physical memory 32 to a remap window 54 in a first virtual address space 56. In some embodiments, ATM 26 may be aware of the mapping of remap window 54 in first virtual address space 56 to a corresponding window 58 in a second virtual address space 60. In such embodiments, ATM 26 may provide the remapped addresses in window 58 to operating system 30. Operating system 30 may associate the remapped addresses in window 58 with memory region 52 in physical memory 32.

In some embodiments, ATM 26 may not be aware of the mapping of remap window 54 in first virtual address space 56 to corresponding window 58 in second virtual address space 60. In such embodiments, ATM 26 may provide the physical addresses of memory region 52 as remapped addresses to operating system 30. Operating system 30 may map the provided physical addresses of memory region 52 to window 58 in second virtual address space 60. Operating system 30 may respond to the request from request module 51 with the virtual addresses in window 58 of second virtual address space 60.

Figure 3:
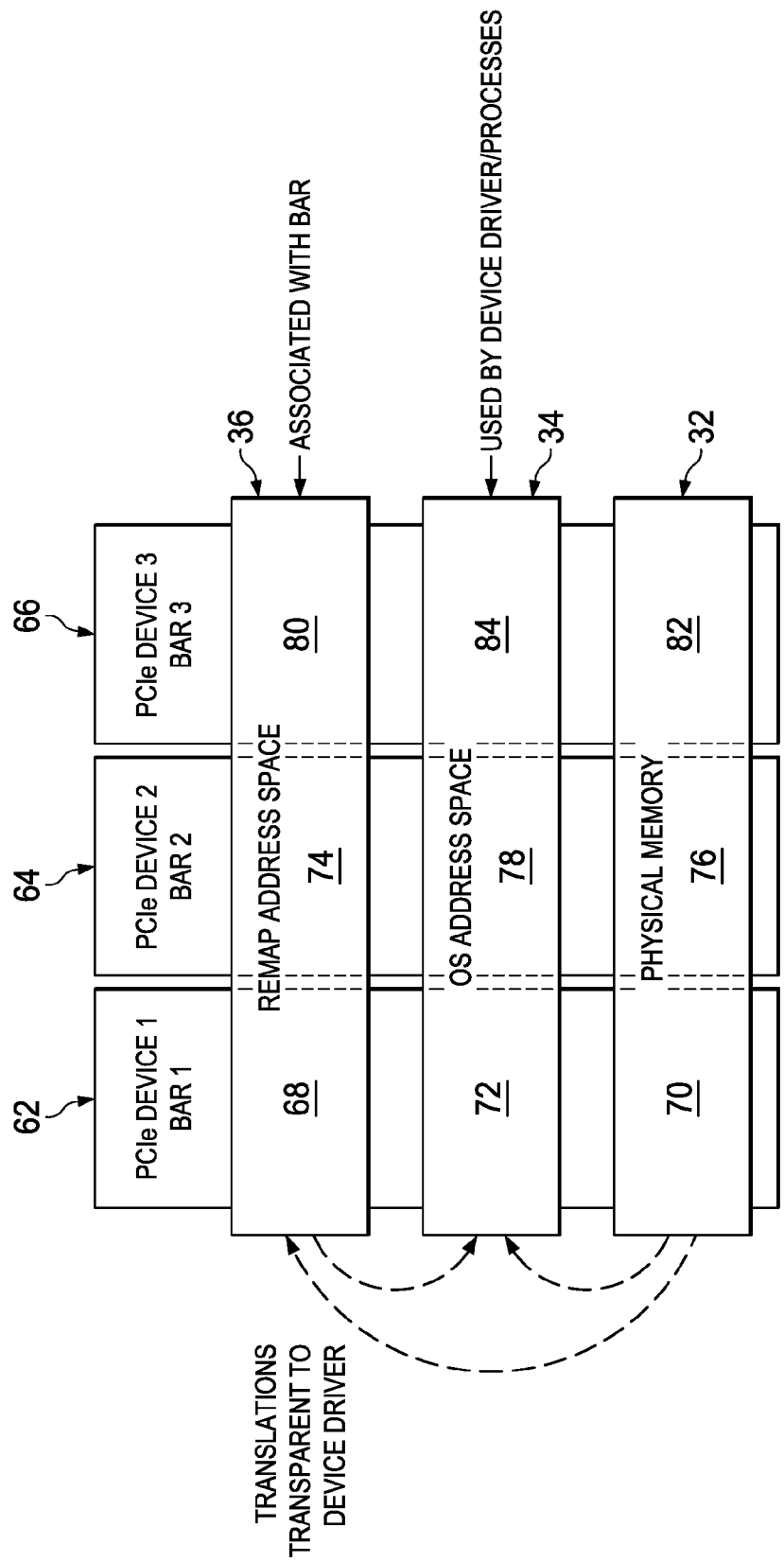
FIG. 3 is a simplified block diagram illustrating yet other example details of embodiments of the communication system.

Turning to FIG. 3, FIG. 3 is a simplified block diagram illustrating example details of an embodiment of communication system 10. According to various embodiments, BARs 62, 64, and 66 of PCIe devices 18 (e.g., respectively, PCIe device 1, PCIe device 2, PCIe device 3) may request memory. BAR 62 may be associated with window 68 in remap address space 36. Window 68 may correspond to memory region 70 in physical memory 32. Memory region 70 may correspond to window 72 in OS address space 36. Likewise, BAR 64 may be associated with window 74 in remap address space 36, which maps to memory region 76 in physical memory 32, which in turn corresponds to window 78 in OS address space 34. Similarly, BAR 66 may be associated with window 80 in remap address space 36, which maps to memory region 82 in physical memory 32, which in turn corresponds to window 84 in OS address space 34. Thus, windows 68, 74, and 80 in remap address space 36 may be associated with respective BARs 62, 64 and 66. Windows 72, 78 and 84 in OS address space 32 may be used by device driver 38 or other processes interacting with memory within operating system 30.

Figure 4:
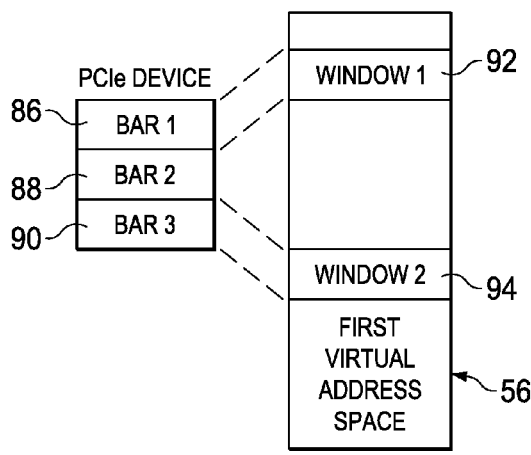
FIG. 4 is a simplified block diagram illustrating yet other example details of embodiments of the communication system.

Turning to FIG. 4, FIG. 4 is a simplified block diagram illustrating example details of an embodiment of communication system 10. A single PCIe device may be associated with more than one BAR, for example, BARs 86, 88 and 90. In various embodiments, two BARs of the same PCIe device can be allocated from different remap windows if one remap window cannot satisfy the request. For example, BAR 86 may be allocated to window 92 in first virtual address space 56 and BAR 90 may be allocated to window 94 in first virtual address space 56.

Figure 5:
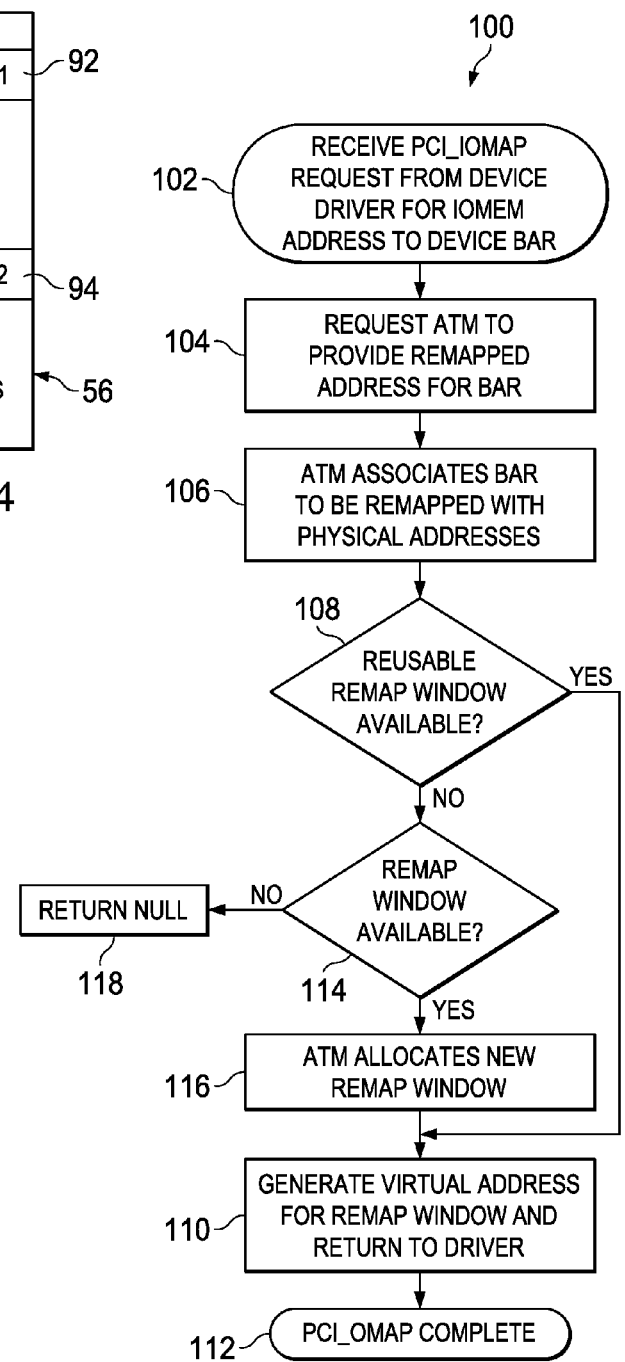
FIG. 5 is a simplified flow diagram illustrating example operations that may be associated with an embodiment of the communication system.

Turning to FIG. 5, FIG. 5 is a simplified flow diagram illustrating example operations 100 that may be associated with embodiments of communication system 10. At 102, operating system 10 receives a PCI_IOMAP request from device driver 38 for IOMEM address to device BAR for a particular PCIe device. At 104, operating system 10 requests ATM 26 to provide remapped address for the BAR. At 106, ATM 26 associates the BAR to be remapped with physical addresses in physical memory 32. At 108, a determination may be made whether a reusable remap window is available. If a reusable remap window is available, at 110, virtual addresses for the remap window (e.g., starting address and offset) may be returned to device driver 38.

Turning back to 108, if a reusable remap window is not available, at 114, a determination may be made if a [new] remap window is available. The remap window may be available, for example, if physical memory 32 has sufficient space. If the remap window is available, at 116, ATM 26 may allocate a new remap window. The operations may continue to 110, at which virtual addresses for the remap window (e.g., starting address and offset) may be returned to device driver 38. However, if no remap window is available, for example, because physical memory 32 has run out of space, at 118, ATM 26 may return a NULL (e.g., error), which may be relayed to device driver 38.

Figure 6A:
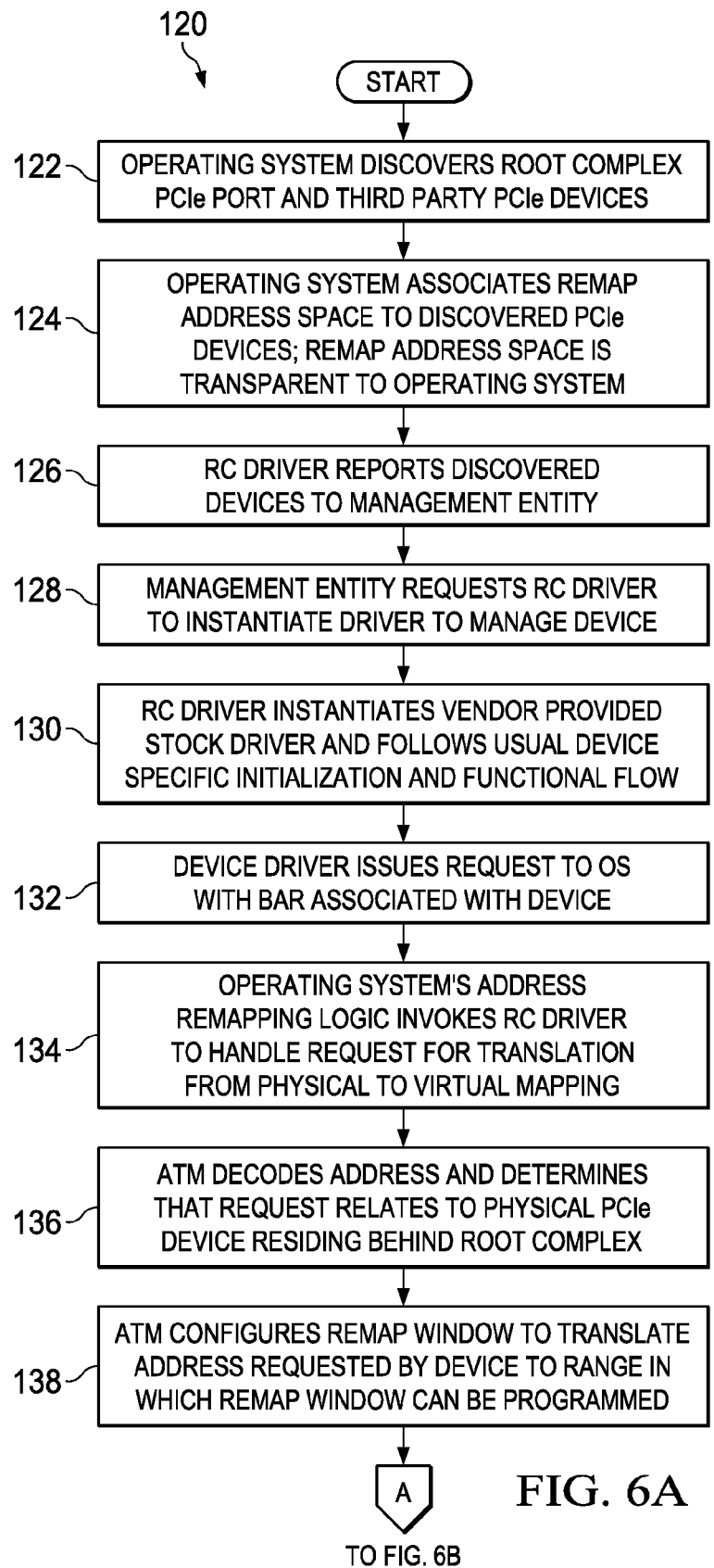
FIGS. 6A and 6B are simplified flow diagrams illustrating other example operations that may be associated with an embodiment of the communication system.
Figure 6B:
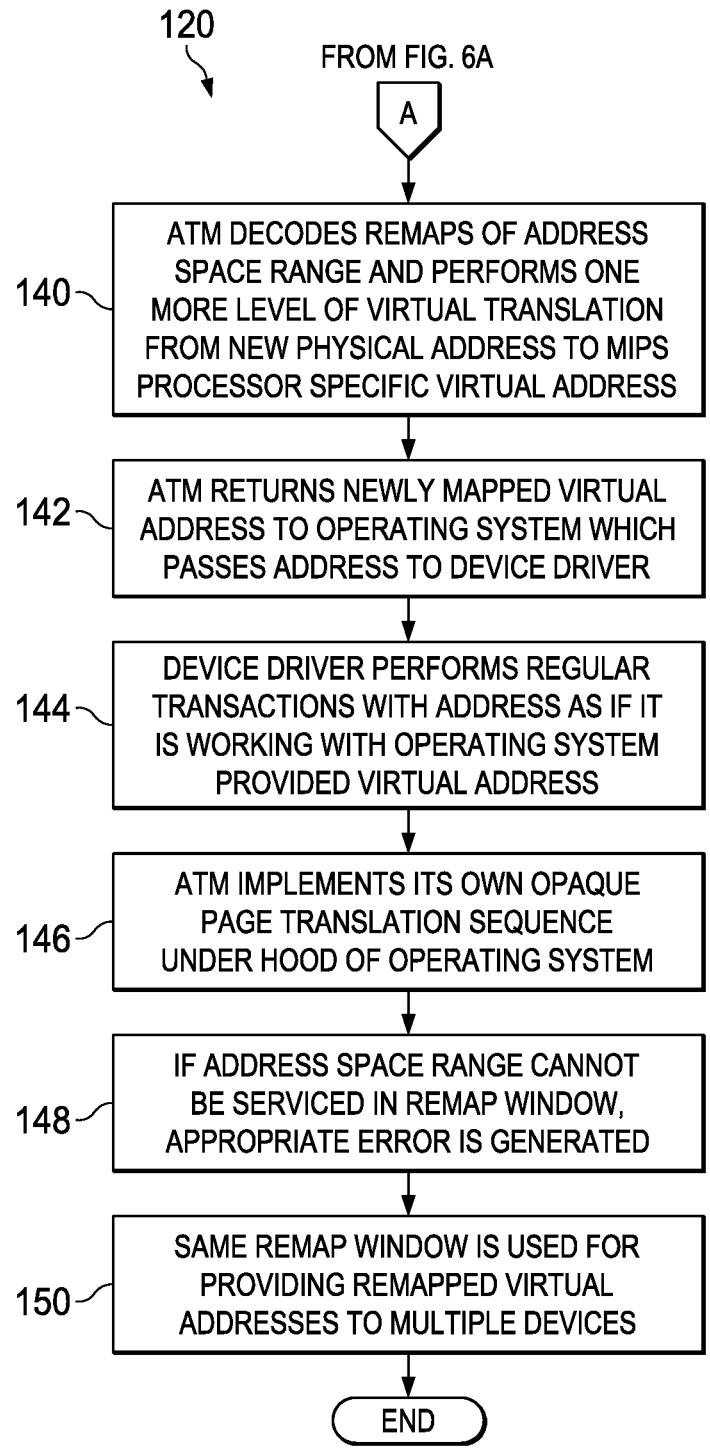

Turning to FIGS. 6A and 6B, FIGS. 6A and 6B are simplified flow diagrams illustrating example operations 120 that may be associated with embodiments of communication system 10. At 122, operating system 30 discovers root complex PCIe port 20 and third-party PCIe devices 18. At 124, operating system 30 associates remap address space 36 to the discovered PCIe devices 18; remap address space 36 may be transparent to operating system 30. At 126, RC driver 25 may report the discovered PCIe devices 18 to management 38. At 128, management entity 38 requests RC driver 25 to instantiate device driver 38 to manage PCIe devices 18. At 130, RC driver 25 instantiates vendor provided stock device driver 38 and follows usual device specific initialization and functional flow.

At 132, device driver 38 issues a request to operating system 30 with the BAR of the relevant PCIe device 18. At 134, operating system 30's address remapping logic invokes RC driver 25 to handle the request for translation from physical to virtual mapping. At 136, ATM 26 in RC driver 25 decodes the address associated with the BAR and determines that the request relates to a particular physical PCIe device residing behind the root complex. At 138, ATM 26 may configure a remap window to translate the address requested by PCIe device 18 to a range in which the remap window can be programmed.

At 140, ATM 26 may decode remaps of address space range and perform one or more level of virtual translation from new physical address to MIPS processor specific virtual address of OS address space 34. At 142, ATM 26 may return newly mapped virtual address to operating system 30, which passes addresses to device driver 38. At 144, device driver 38 may perform regular transactions with the address as if it is working with operating system provided virtual address. In other words, device driver 38 is not aware that the BAR was remapped to OS address space 34 from remap address space 36. At 146, ATM 26 implements its own opaque page translation sequence under hood of operating system 30. At 148, if the address space range cannot be serviced in the remap window, an appropriate error is generated. At 150, a same remap window space may be used to provide remapped virtual addresses to multiple devices. In other words, BAR 1 of PCIe device 1 may be mapped to window 1 in remap address space 36; after a few transactions, if window 1 is not used any more by PCIe device 1, window 1 may be reused for BAR 1 of another PCIe device 2.

Figure 7:
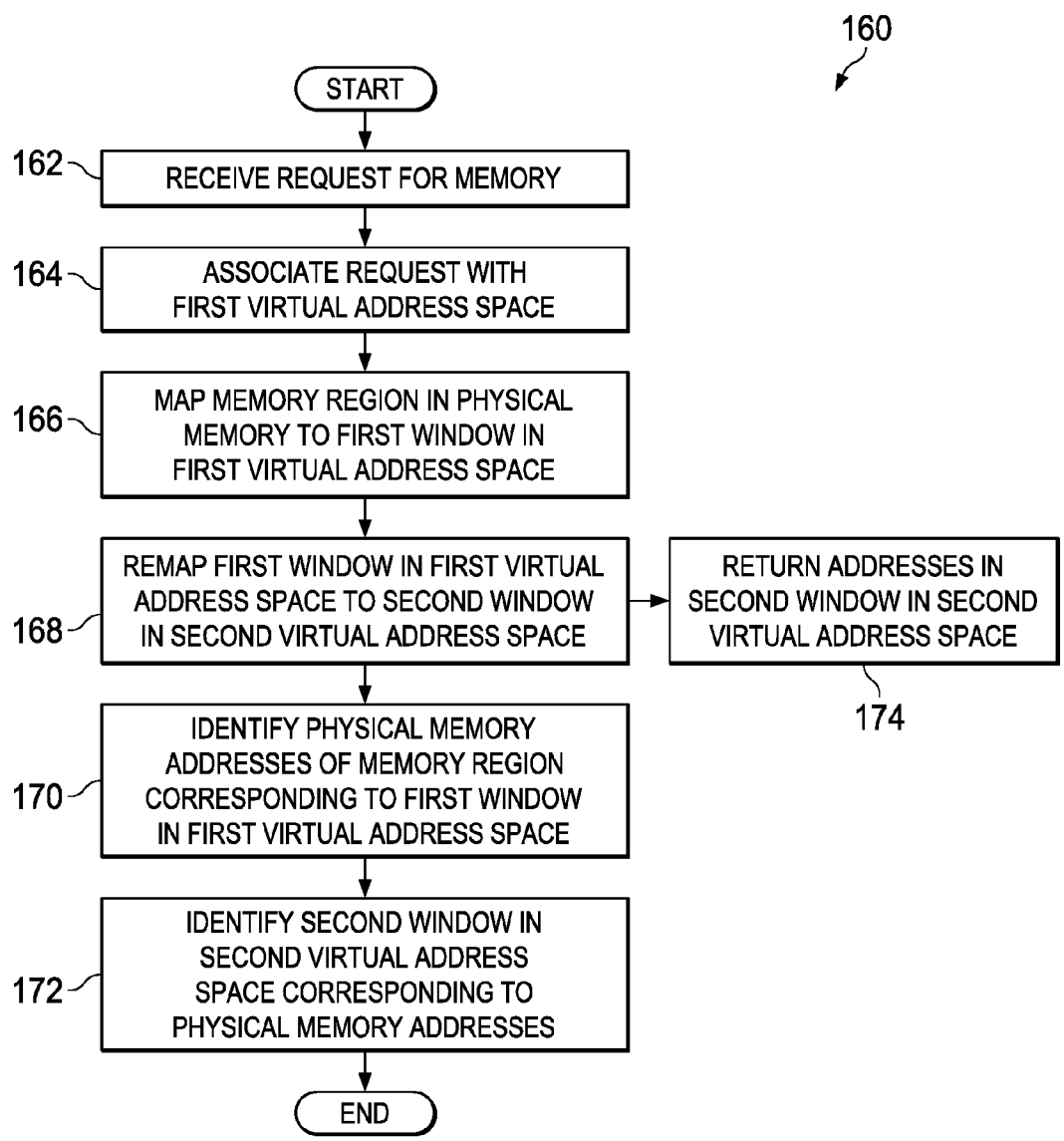
FIG. 7 is a simplified flow diagram illustrating yet other example operations that may be associated with an embodiment of the communication system.

Turning to FIG. 7, FIG. 7 is a simplified flow diagram illustrating example operations 160 that may be associated with embodiments of communication system 10. At 162, operating system 30 may receive a request for memory from request module 51. At 164, operating system 30 may associate the request with first virtual address space 56. At 166, ATM 26 may map memory region 52 in physical memory 32 to first window 54 in first virtual address space 56. At 168, first window 54 in first virtual address space 56 may be remapped to second window 58 in second virtual address space 60. In some embodiments, the remapping may include at 170, identifying physical memory addresses of memory region 52 corresponding to first window 54 in first virtual address space 56; and at 172, identifying second window 58 in second virtual address space 60 corresponding to physical memory addresses of memory region 52. At 174, operating system 30 may return addresses in second window 58 of second virtual address space 60.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, adapter 12 or network element 50. In some embodiments, one or more of these features may be implemented in hardware, provided external to these elements, or consolidated in any appropriate manner to achieve the intended functionality. The various network elements (e.g., adapter 12, PCIe devices 18, computing systems 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, adapter 12 and network element 50 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., physical memory 32) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 28) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.'

Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a network element having a processor, comprising:
    receiving a request from a device for space in a physical memory of the network element;
    scanning through a remap address space in a first virtual memory space of the network element, wherein addresses in the remap address space correspond to contiguous memory regions in the physical memory, wherein the contiguous memory regions correspond to virtual addresses in a second virtual memory space of the network element;
    allocating a remap window in the remap address space to the device; and
    returning physical memory offsets in the physical memory corresponding to the allocated remap window.

2. The method of claim 1, further comprising:
- if an already allocated remap window in the remap address space satisfies the request, re-allocating the remap window to the device; and
- if no remap window in the in the remap address space satisfies the request, allocating a new remap window to the device.

3. The method of claim 1, further comprising translating the allocated remap window to addresses in the second virtual memory space.

4. The method of claim 1, wherein the request is received at an operating system (OS) of the network element from a device driver of the device, the request referencing an address space beyond an addressability range of the processor.

5. The method of claim 4, wherein the scanning and the allocating are performed by an address translation module (ATM) of an adaptor in the network element.

6. The method of claim 5, further comprising associating, by the OS, the request from the device driver with the remap address space and punting the request to the ATM.

7. The method of claim 4, wherein the method further comprises, returning, by the OS to the device driver, addresses in the second virtual memory space corresponding to the physical memory offsets.

8. The method of claim 4, wherein addresses in the remap address space are irrelevant to the OS and the processor.

9. The method of claim 1, wherein an OS of the network element uses the second virtual memory space, wherein the device references an address in the first virtual memory space.

10. The method of claim 1, wherein the device comprises a Peripheral Component Interconnect Express (PCIe) device, wherein a base address register (BAR) number of the device corresponds to an address space in the first virtual memory space.

11. Non-transitory tangible media that includes instructions for execution, which when executed by a processor of a network element, is operable to perform operations comprising:
- receiving a request from a device for space in a physical memory of the network element;
- scanning through a remap address space in a first virtual memory space of the network element, wherein addresses in the remap address space correspond to contiguous memory regions in the physical memory, wherein the contiguous memory regions correspond to virtual addresses in a second virtual memory space of the network element;
- allocating a remap window in the remap address space to the device; and
- returning physical memory offsets in the physical memory corresponding to the allocated remap window.

12. The media of claim 11, wherein the request is received at an OS of the network element from a device driver of the device, the request referencing an address space beyond an addressability range of the processor.

13. The media of claim 12, wherein the scanning and the allocating are performed by an ATM of an adaptor in the network element.

14. The media of claim 13, the operations further comprising associating, by the OS, the request from the device driver with the remap address space and punting the request to the ATM.

15. The media of claim 11, wherein an OS of the network element uses the second virtual memory space, wherein the device references an address in the first virtual memory space.

16. An apparatus, comprising:
- a physical memory for storing data; and
- a processor, wherein the processor executes instructions associated with the data, wherein the processor and the physical memory cooperate, such that the apparatus is configured for:
  - receiving a request from a device for space in the physical memory;
  - scanning through a remap address space in a first virtual memory space of the apparatus, wherein addresses in the remap address space correspond to contiguous memory regions in the physical memory, wherein the contiguous memory regions correspond to virtual addresses in a second virtual memory space of the apparatus;
  - allocating a remap window in the remap address space to the device; and
  - returning physical memory offsets in the physical memory corresponding to the allocated remap window.

17. The apparatus of claim 16, further comprising an OS, wherein the request is received at the OS from a device driver of the device, the request referencing an address space beyond an addressability range of the processor.

18. The apparatus of claim 17, further comprising an adaptor including an ATM, wherein the scanning and the allocating are performed by the ATM.

19. The apparatus of claim 18, the operations further comprising associating, by the OS, the request from the device driver with the remap address space and punting the request to the ATM.

20. The apparatus of claim 16, wherein an OS of the apparatus uses the second virtual memory space, wherein the device references an address in the first virtual memory space.

* * * * *